(12) United States Patent
Tamba et al.

(10) Patent No.: US 8,672,803 B2
(45) Date of Patent: Mar. 18, 2014

(54) AUTOMATED MANUAL TRANSMISSION WITH HYBRID DRIVE

(75) Inventors: Richard Terrence Tamba, Castle Hill (AU); Simon Fitzgerald, Castle Hill (AU)

(73) Assignee: NT Consulting International Pty. Ltd. (AU)

( * ) Notice: Subject to any disclaimer, the term of this patent is extended or adjusted under 35 U.S.C. 154(b) by 195 days.

(21) Appl. No.: 13/140,684

(22) PCT Filed: Dec. 17, 2009

(86) PCT No.: PCT/AU2009/001637
§ 371 (c)(1),
(2), (4) Date: Aug. 31, 2011

(87) PCT Pub. No.: WO2010/068987
PCT Pub. Date: Jun. 24, 2010

(65) Prior Publication Data
US 2011/0306463 A1     Dec. 15, 2011

(30) Foreign Application Priority Data
Dec. 17, 2008  (AU) ................................ 2008906486

(51) Int. Cl.
*B60W 10/02*   (2006.01)
*B60W 10/08*   (2006.01)

(52) U.S. Cl.
USPC .................... 477/5; 477/8; 903/914; 903/946

(58) Field of Classification Search
USPC ........... 477/3, 5–8; 180/65.21, 65.245, 65.26, 180/65.31, 65.285; 903/902, 904, 906, 909, 903/912, 914, 946
See application file for complete search history.

(56) References Cited

U.S. PATENT DOCUMENTS

| 4,873,881 | A   | * | 10/1989 | Edelen et al. ............... 74/336 R |
| 5,943,918 | A   | * | 8/1999  | Reed et al. ...................... 74/661 |
| 5,996,754 | A   | * | 12/1999 | Reed et al. .................... 192/48.2 |
| 6,019,698 | A   |   | 2/2000  | Lawrie et al. |
| 6,332,257 | B1  |   | 12/2001 | Reed, Jr. et al. |
| 6,976,934 | B2  | * | 12/2005 | Komeda et al. .................... 477/5 |
| 7,814,806 | B2  | * | 10/2010 | DeVore et al. .................. 74/335 |
| 8,453,772 | B2  | * | 6/2013  | Brown ..................... 180/65.285 |
| 2002/0061803 | A1 | * | 5/2002 | Aoki ................................ 477/3 |
| 2008/0156550 | A1 |   | 7/2008  | Wei et al. |

FOREIGN PATENT DOCUMENTS

DE     19745995 A1    9/1998
DE   102007001841 A1  5/2008

OTHER PUBLICATIONS

International Search Report for PCT/AU2009/001637, mailed Apr. 9, 2010.

* cited by examiner

*Primary Examiner* — Justin Holmes
(74) *Attorney, Agent, or Firm* — Banner & Witcoff, Ltd.

(57) ABSTRACT

An automated manual transmission system (1) including an input shaft (4), a clutch, an output shaft (6), and a gearbox enabling selection of different transmission ratios between the input shaft and the output shaft (6). An actuation mechanism (10) is operatively connected to the clutch and the gearbox to effect disengagement and re-engagement of the clutch and coordinated selection of the transmission ratios. A hybrid motor (14) is operably connected to the output shaft (6) and a control system (16) is operable to regulate the actuating mechanism in response to control inputs, to effect automatic gear changes. The hybrid motor (14) is responsive to the control system (16) to provide supplementary torque to the vehicle driveline when the clutch is disengaged, to reduce torque interruption in the driveline.

20 Claims, 5 Drawing Sheets

AUTOMATED MANUAL TRANSMISSION WITH HYBRID DRIVE

This application is a U.S. National Phase Application under 35 U.S.C. §371 and claims priority to PCT/AU2009/001637 filed on Dec. 17, 2009, and of Application No. 2008906486 filed in Australia on Dec. 17, 2008.

FIELD OF THE INVENTION

The present invention relates generally to an automated manual transmission incorporating a hybrid drive system. The invention has been developed primarily for use in automotive applications and will be described primarily in this context. It should be appreciated, however, that the invention is not limited to this particular field of use, being potentially applicable to virtually any application involving an engine and a multiple ratio gearbox, including but not limited to marine, rail transport, aeronautical and stationary applications.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Manual transmissions are well known in automotive applications and have the advantages of being relatively inexpensive, easy to manufacture, lightweight, robust and efficient in terms of power transmission. However, manual transmissions demand greater skill and effort from the driver of the vehicle, who must typically coordinate the movements of a manual gearshift lever and a clutch pedal in order to change transmission ratios as and when required. Even with reasonable driver skill, the changes are not completely smooth due to the inherent interruption in power transmission from the engine to the driveline, when the clutch is disengaged. Increasingly, drivers are tending to prefer the convenience and the smoothness of automatic transmissions, which are also well known. However, automatic transmissions are typically heavier, and more complex, costly and difficult to produce, as well as being less efficient in operation.

In an attempt to address at least some of these issues, automated manual transmissions (AMTs) have also been developed. Such transmissions essentially incorporate the internal gear trains of a manual transmission, but additionally provide some form of automated control over the gear selection mechanism and/or the clutch. Transmissions of this type do provide some of the benefits of both manual and automatic transmissions, including particularly with regard to shifting automation and fuel efficiency. However, they give rise to other disadvantages, the most notable being an undesirable tendency for abrupt or "jerky" operation, as the drive torque from the engine is alternately interrupted and re-connected during each gear change. Smooth acceleration from a standing start without clutch "judder" is also typically problematic. Attempts to ameliorate this problem, for example by control algorithms dictating more clutch slip and more progressive clutch engagement, typically compromise fuel efficiency and result in rapid clutch wear. Viscous fluid coupling elements have also been used in an attempt to ameliorate this problem but again, they inherently compromise the efficiency of the transmission or the driveline.

It is an object of the present invention to overcome or substantially ameliorate one or more of the disadvantages of prior art, or at least to provide a useful alternative.

SUMMARY OF THE INVENTION

Accordingly, in a first aspect, the invention provides an automated manual transmission system for a vehicle having an engine and a driveline, the transmission system including:
  an input shaft;
  a clutch adapted to be interposed between the input shaft and the engine;
  an output shaft adapted for connection to the driveline;
  a gearbox enabling selection of different transmission ratios between the input shaft and the output shaft;
  an actuation mechanism operatively connected to the clutch and the gearbox to effect disengagement and re-engagement of the clutch and coordinated selection of the transmission ratios;
  a hybrid motor operably connected to the output shaft; and
  a control system operable to regulate the actuating mechanism in response to control inputs, according to predetermined control criteria, thereby to effect automatic gear changes;
  the hybrid motor being responsive to the control system to provide supplementary torque to the vehicle driveline when the clutch is disengaged, thereby to reduce torque interruption in the driveline during the automatic gear changes.

Preferably, the control system is selectively operable in either a fully automatic mode, in which appropriate gear selections are determined and implemented according to the predetermined control criteria, or in a semi-automatic mode, in which gear selections are determined by the driver within predetermined control parameters but are implemented automatically by the actuation mechanism.

In one embodiment, the transmission system is retrofitted to a conventional manual gearbox. In another embodiment, the gearbox is purpose-built or optimised for use in the transmission system of the invention.

In one embodiment, the hybrid motor is part of a regenerative drive system adapted to store energy from the vehicle driveline during braking or periods of off-peak load, and subsequently to feed the stored energy back into the driveline to eliminate or reduce the transient loss of driveline torque during gear changes. The regenerative drive system is also controlled in some embodiments to supplement engine power under conditions of peak load.

In one preferred embodiment, the hybrid motor takes the form of an hydraulic motor. In some embodiments, the hydraulic motor sources power from an existing hydraulic circuit on the vehicle, such as an hydraulic power steering pump. In other embodiments, a dedicated hydraulic pump is provided.

In one embodiment, as part of a regenerative drive system, the hybrid motor comprises an hydraulic pump/motor unit connected to the vehicle driveline and the hydraulic power is sourced, at least in part, from an hydraulic/pneumatic cylinder. In this embodiment, the cylinder preferably contains a working gas that is compressed by the hydraulic pump/motor unit operating as a pump drawing power from the driveline in an energy storage mode. Preferably, the cylinder is subsequently used as a source of hydraulic pressure for the hydraulic pump/motor unit operating as a motor supplying power to the driveline in an energy release mode. The hydraulic pump/motor unit is preferably also operable in a neutral mode, in which power is neither drawn from nor supplied to the vehicle driveline.

In other embodiments, other forms of hybrid motors are used, such as one or more electric motors, pneumatic motors, inertial flywheel motors, or other suitable sources of intermittent, supplementary or regenerative power. In one preferred embodiment, the hybrid motor is an electric motor connected to high-performance super-capacitors capable of rapid charge and discharge, so as to provide suitable transient levels of power on demand to the motor. The electric motor may additionally or alternatively be used in conjunction with any suitable combination of batteries, as well as other sources of electric power, such as solar panels.

Preferably, the actuation mechanism incorporates at least one electro-hydraulic piston actuator. In a particularly preferred embodiment, a pair of 3-position electro-hydraulic piston actuators is provided, these actuators preferably being regulated by a single multiplexing control valve. In one preferred embodiment, the first 3-position actuator is disposed to move a gear-shift lever longitudinally between a forward position, a neutral position and a rearward position, while the second 3-position actuator is disposed to move the same gear-shift lever laterally between a left position, a central position and a right position. In this way, it will be appreciated that the two actuators, cooperating through the various combinations of mutually orthogonal movements, can provide automatic selection between up to six different gear ratios. Combined with a single multiplexing control valve operated by a series of three solenoids, this arrangement provides a simple, compact, efficient and effective actuation mechanism for the transmission.

In one preferred embodiment, oil pressure for the actuation mechanism is sourced from a dedicated pump disposed within the transmission housing, and powered by the vehicle engine, optionally via a pump drive shaft extending coaxially through a complementary bore formed in the input shaft. Alternatively, however, in other embodiments, supply pressure for the actuation mechanism may be sourced from an existing hydraulic circuit in the vehicle, such as an hydraulic power steering or braking circuit. In other embodiments, electric pumps optionally operating in conjunction with accumulators are used. In yet other embodiments, the actuators need not be hydraulic or electro-hydraulic but may alternatively be electro-pneumatic or electro-mechanical, for example. In cases where the actuators are electrically activated, power may be sourced from a battery, a generator, a capacitor, or any combination of one or more such sources. Alternative control systems for the actuators may make use of position sensors and feedback control loops, for example.

According to a second aspect, the invention provides a vehicle driveline incorporating an automatic manual transmission system substantially as previously described.

According to a third aspect, the invention provides a vehicle incorporating an engine and a driveline, the driveline including a transmission system substantially as previously defined.

According to a further aspect, the invention provides a method of converting a conventional manual transmission into an automated manual transmission system as previously defined, the conventional manual transmission including an existing gearbox, an existing gear change lever, and existing clutch, and an existing clutch actuation system, the method including the steps of:

removing the existing gear change lever;

removing the existing clutch actuation system;

providing an actuation mechanism operatively connected to the existing clutch and the existing gearbox to effect disengagement and re-engagement of the clutch and coordinated selection of the gearbox transmission ratios in the manner previously described;

providing a control system operable to regulate the actuation mechanism in response to control inputs, according to predetermined control criteria, thereby to effect automatic gear changes; and providing a hybrid motor responsive to the control system and adapted in use to provide supplementary torque to the vehicle driveline when the clutch is disengaged, thereby to reduce torque interruption in the driveline during the automatic gear changes.

Preferably, the conventional manual transmission further includes an existing rear casing, and the method preferably includes the further steps of removing the existing rear casing, and providing a new rear casing. The new rear casing preferably includes an integral hydraulic pump system for the actuation mechanism.

Preferably, the method includes the further step of providing a parking mechanism with a park locking function, adapted in use to lock the transmission and hence the vehicle driveline, when the vehicle is placed in a parking mode.

Preferably, the new rear casing further includes integral mounting points for the hybrid motor.

Preferably, the actuation mechanism is attached to the transmission in or around the location previously occupied by the gear change lever and clutch lever assemblies.

Preferably, the method includes the further step of connecting associated wiring and hydraulic connections as necessary to complete installation of the transmission into a vehicle.

In one preferred embodiment, the method includes the further step of modifying the input shaft by forming a bore through the centre thereof, the bore being preferably adapted to provide access for a coaxial quill shaft to drive the integral hydraulic pump for the actuation mechanism. In an alternative embodiment, an existing source of hydraulic pressure in the vehicle is used for the actuation mechanism, such as an existing power steering pump.

According to a further aspect, the invention provides an actuation mechanism for an automated manual transmission system as defined above, the actuation mechanism including a pair of 3-position electro-hydraulic or electro-mechanical piston actuators, the first 3-position actuator being disposed to move a gear-shift lever longitudinally between a forward position, a neutral position and a rearward position, and the second 3-position actuator being disposed to move the gear-shift lever laterally between a left position, a central position and a right position, the first and second actuators being co-operable in use, in response to a control system, to provide automatic selection between a plurality of different gear ratios in the transmission system.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Referring to the drawings, the invention provides an automated manual transmission system 1 for a vehicle (not shown) having an engine 2 and a driveline. The invention has been developed primarily for use in automotive applications but can be readily adapted for a variety of other uses.

Figure 1:
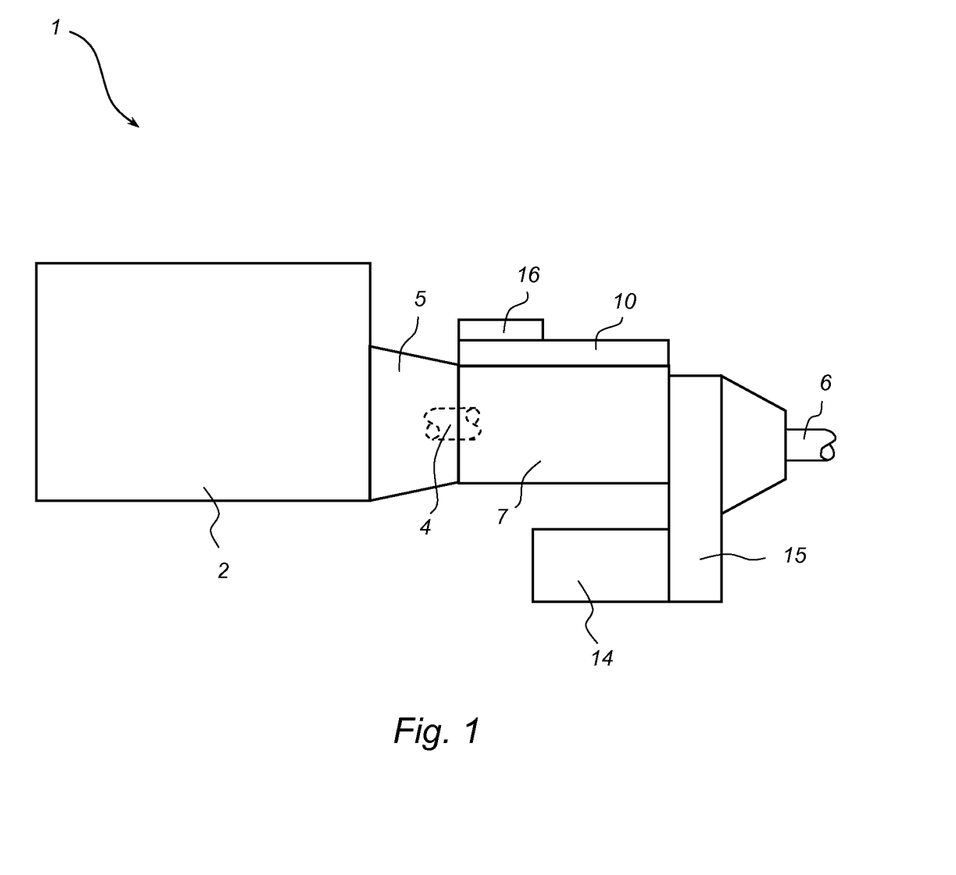
FIG. 1 is a block diagram showing an automated manual transmission system adapted for integration into a vehicle driveline, according to a first embodiment of the invention.

As best seen in FIG. 1, the transmission system according to a first embodiment of the invention includes an input shaft 4, a clutch contained within a clutch housing 5 and disposed between the input shaft and the engine, an output shaft 6 adapted for connection to the vehicle driveline, and a gearbox disposed with a main transmission housing 7. The gear box enables selection of different transmission ratios between the input shaft and the output shaft. In some embodiments, the system is built around a conventional manual gearbox. It should be appreciated, however, that purpose-built or specifically optimised gearboxes can also be used. It should also be appreciated that the invention can be used with synchromesh, or constant-mesh or other gearbox configurations.

The transmission system further includes an actuation mechanism 10 operably connected to the clutch via a clutch actuation system and connected to the gearbox 7 via a gear selection lever 12 (see FIG. 4), to effect disengagement and reengagement of the clutch and coordinated selection of appropriate transmission ratios, as described in more detail below. The system also includes a hybrid motor 14 operably connected to the output shaft 6 through a transfer case 15. In the embodiment shown, the hybrid motor is an electric motor. Alternatively, however, it would be appreciated that hydraulic motors, pneumatic motors or other forms of supplementary drive unit including inertial flywheels and the like, may also be used.

A control system 16 is operable to regulate the actuating mechanism 10 in response to various control inputs, and according to predetermined control algorithms, to effect automatic gear changes. The hybrid motor is also responsive to the control system 16, so as to provide supplementary torque to the output shaft and hence the vehicle driveline, when the clutch is disengaged. Advantageously, this eliminates or at least reduces the extent of torque interruption in the driveline during the automated gear changes. The control system may also be programmed to match the speed of the engine with the speed of the driveline during gear changes, to provide a further level of smoothness, efficiency and flexibility.

The control system is selectively operable in either a fully automatic mode, in which appropriate gear selections are determined and implemented automatically according to the control algorithms, which may include adaptive functionality that is responsive over time to individual driving patterns, or in a semi-automatic mode. In the semi-automatic mode, gear selections are determined by the driver (within predetermined control parameters) but are implemented automatically by the actuation mechanism, in response to driver inputs indicative of the desired gear change. These driver inputs can be made through gear-change "paddles" incorporated into the steering wheel, by a "tiptronic" style lever, or by other suitable control input mechanisms. The semi-automatic mode is constrained by predetermined control parameters to avoid the risk of inappropriate gear selections that could cause damage to the engine or driveline of the vehicle. For example, gear selections that would result in the engine over-revving or being subject to excessive load at low speed, are over-ridden by the control system. Such control algorithms are well understood by those skilled in the art in connection with conventional automatic transmissions and so are not described in further detail. The control system is preferably designed or programmed such that when the vehicle ignition is turned off and back on again, the transmission operation reverts to the fully automatic mode, so that by default, optimum fuel economy and performance are maintained independently of input from the driver.

The hybrid motor 14 in the embodiment shown is an electric motor, coupled to a combination of batteries and high-performance capacitors adapted to provide sufficiently high rates of charge and discharge to meet the transient power and torque demands of the system in the present context. It should be appreciated, however, that other forms of hybrid motor may additionally or alternatively be used, including hydraulic or pneumatic motors, inertial flywheels and the like.

Figure 2:
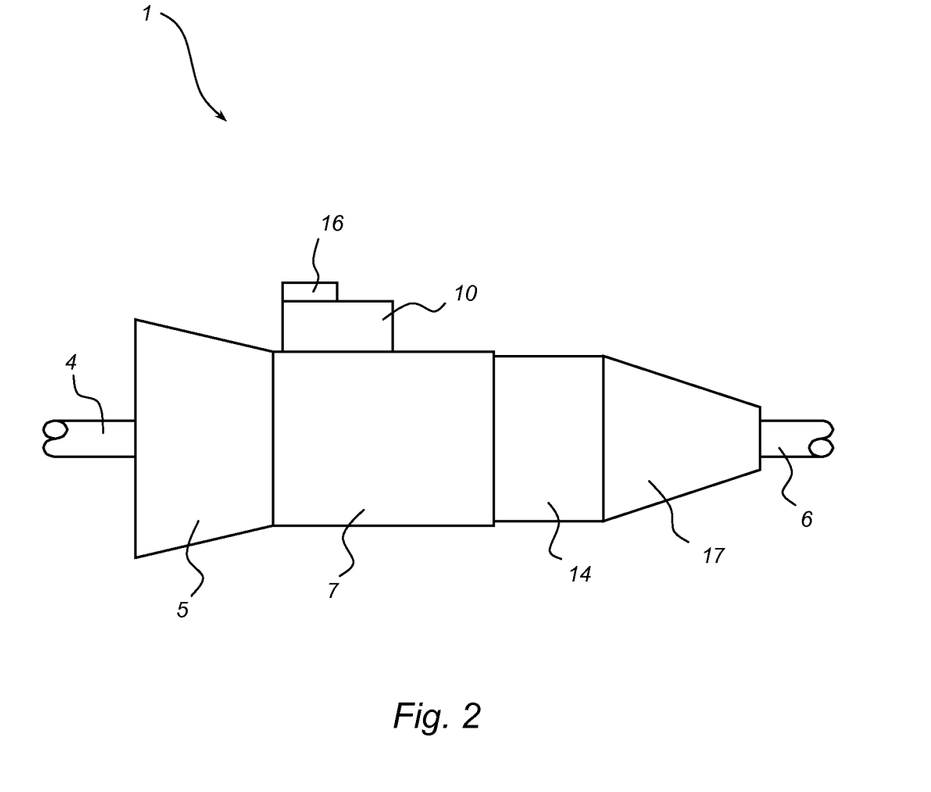
FIG. 2 is a block diagram similar to FIG. 1, showing an automated manual transmission system adapted for integration into a vehicle driveline, according to a second embodiment of the invention.

In an alternative embodiment, shown in FIG. 2, the hybrid motor 14 is mounted between the main transmission housing 7 and a rear extension housing 17, with the main output shaft 6 extending coaxially through the hybrid motor. It will be appreciated that this arrangement avoids the need for a separate transfer case and is therefore more compact than the embodiment shown in FIG. 1.

The hybrid motor 14 is preferably part of a regenerative drive system adapted to store energy from the vehicle driveline during braking or periods of off-peak load and subsequently to feed this stored energy back into the driveline when required, to eliminate or at least reduce the transient loss of driveline torque during gear changes. The hybrid motor may also be regulated to feed supplementary power into the driveline during periods of maximum load to supplement the power from the primary engine, for example when negotiating steep inclines, towing, or accelerating from a standing start.

In one embodiment (not shown), the hybrid motor comprises an hydraulic pump/motor unit connected to the vehicle driveline as part of a regenerative drive system, for which hydraulic power is sourced, at least in part, from an hydraulic/pneumatic cylinder functioning as an accumulator. In this embodiment, the accumulator preferably contains a working gas such as air, carbon dioxide, nitrogen or a suitable refrigerant gas such as R134A. This gas is progressively compressed by the hydraulic pump/motor unit operating as a pump, drawing power from the driveline, in an energy storage mode. This compression would typically take place during braking, so that the regenerative drive system supplements the conventional braking system of the vehicle while charging the accumulator. The accumulator is subsequently used as a source of hydraulic pressure for the hydraulic pump/motor unit operating as a motor, supplying power back to the driveline in an energy release mode. This would typically take place during gear changes to minimise disruption to the drive torque, as well as during periods of peak load such as when negotiating hills or accelerating. In this embodiment, the hydraulic pump/motor unit is preferably also operable in a neutral mode, in which power is neither drawn from nor supplied to the vehicle driveline. This might be required, for example, when the hydraulic accumulator is fully charged and consequently, any redundant load on the driveline could compromise the efficiency of the system.

It will be appreciated that the same basic regenerative drive principle may be employed using a variety of different drive units and compatible storage devices in appropriately paired combinations, including, but not limited to:— electric motor plus battery;
electric motor plus capacitor;
electric motor plus flywheel;
pneumatic motor plus accumulators;
pneumatic motor plus air tank;
pneumatic motor plus flywheel
hydraulic motor plus accumulator using oil and water mixture;
hydraulic motor plus accumulator using water only;
hydraulic motor plus flywheel;
etc.

Figure 3:
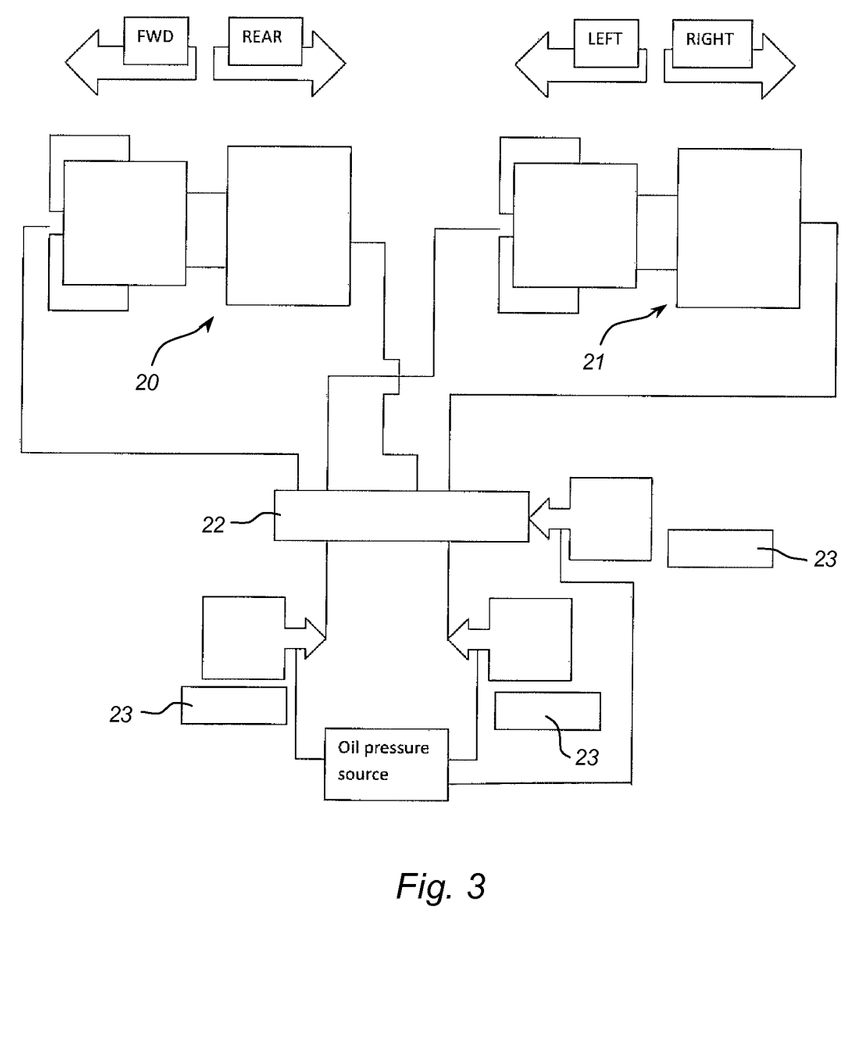
FIG. 3 is a schematic view showing the actuation mechanism from the transmission systems of FIG. 1 and FIG. 2.

Referring to FIG. 3, the actuation mechanism in one embodiment incorporates a pair of 3-position electro-hydraulic piston actuators 20 and 21, operated by a single multiplexing control valve 22. The multiplexing control valve 22 is regulated by a series of three solenoids 23, which in turn are regulated by a CPU as part of the control system. The first 3-position actuator 20 is disposed to move a gear-shift actuation arm longitudinally between a forward position, an intermediate or neutral position, and a rearward position. The second 3-position actuator 21 is disposed to move the gearshift actuating arm laterally between a left position, a central or neutral position and a right position. In this way, appropriately coordinated orthogonal movements of the two actuators through their various combinations of positions can provide automatic selection from between six different gear ratios. In the preferred embodiment, these correspond to the conventional five forward gears and a reverse gear, as well as neutral. It will be appreciated that additional gears can be readily controlled by substituting one or both 3-position actuators for 4-position actuator(s), and so on.

In one preferred embodiment, oil pressure for the actuation mechanism is sourced from a dedicated pump (not shown) integrated into the rear housing 5 of the transmission, and powered by the engine of the vehicle. In other embodiments, however, supply pressure for the actuation mechanism may be sourced from an existing hydraulic circuit in the vehicle, such as an hydraulic power steering or braking circuit. An electric hydraulic pump or a source of positive or negative air pressure may also be used to power the actuators. Accumulators may also be used to store hydraulic or pneumatic fluid pressure. In yet other embodiments, the actuators need not be electro-hydraulic but may alternatively be electro-pneumatic or electro-mechanical, for example. Various alternative control mechanisms for the actuators, such as those involving position sensors and feedback control loops, are also envisaged.

Figure 4:
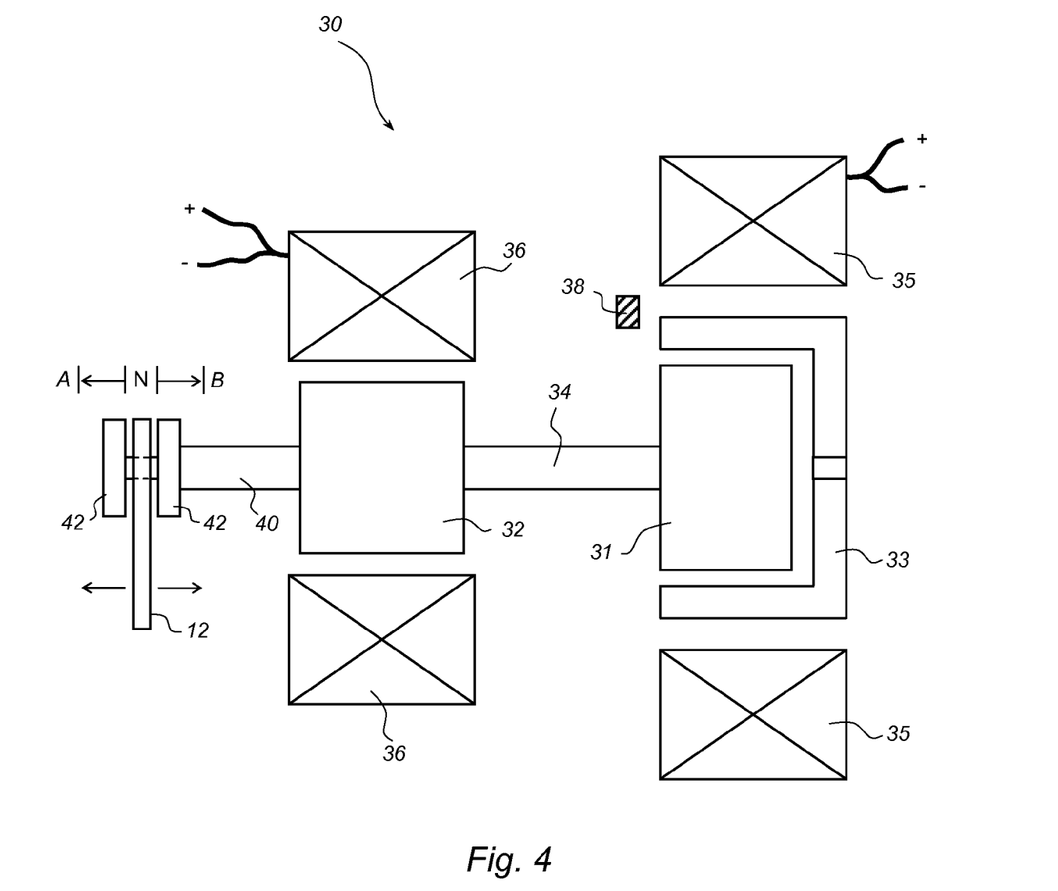
FIG. 4 is an enlarged diagrammatic view showing a 3-area electro-magnetic actuator from the actuation mechanism of FIG. 3.

One alternative form of actuator is shown in FIG. 4, which illustrates a 3-position electro-magnetic actuator 30. This actuator includes a first piston 31, a second piston 32, and a third piston 33. The three pistons are of progressively increasing diameter, and each is formed from a suitable ferrite material. The first and second pistons 31 and 32 are joined by a coaxial connecting rod 34. The first and third pistons 31 and 33 are surrounded by a first electro-magnetic coil 35 while the second piston 32 is surrounded by a second independently operable electro-magnetic coil 36. A stop formation 38 limits the maximum extent of axial excursion of the third piston 33. An actuation rod 40 extends coaxially from the second piston 32, and terminates in a pair of spaced apart locating flanges 42. These locating flanges are adapted for cooperative engagement with the gearshift actuation arm or lever 12. The pistons may be coated with Teflon or a similar low-friction material and/or may be disposed within Teflon or similar sleeves, to assist smooth sliding.

The coils are regulated by the control system, as follows. When the second coil 36 is activated, the second piston 32 is moved to the left (in the orientation of the drawing) so as to move the actuation rod 40 and hence the gearshift lever 12 to the left, into position A. When the first coil 35 is activated, the first and third pistons 31 and 33 are displaced to the right (in the orientation of the drawing), so as to move the actuation rod 40 and hence the gearshift lever 12 to the right, into position B. When the first and second coils 35 and 36 are activated simultaneously, the actuation rod 40 and hence the gearshift lever are moved to an intermediate neutral position N, approximately midway between positions A and B. It will be appreciated that in this embodiment, a second similar actuator (not shown) would be arranged to operate in substantially the same way, but would be oriented orthogonally with respect to the first actuator, the two actuators being controlled in concert so as to provide the appropriate combination of orthogonal movements of the gearshift lever, as previously described.

The coils in various embodiments may source power from batteries, capacitors, or a combination of both. In one embodiment, a bank of capacitors is used, with each capacitor configured to be discharged or "fired" independently, to provide a measure of selective control over the actuation time, and hence the speed of the associated gear changes. In one variation of this embodiment, the capacitors are connected in parallel with a battery, such that the battery alone provides the slowest speed of actuation, the battery combined with discharge from only one capacitor provides slightly faster actuation, the battery combined with simultaneous discharge from two capacitors provides still faster actuation, and so on. By this means, the transmission provides the facility for the driver to select from a number of different shift modes, with increasingly faster shift times typically corresponding to a more sporting style of driving. The same principle may also be applied to provide more flexible control over the hybrid motor, in cases where it is electric.

One preferred form of the present invention is specifically adapted for retrofitting to existing manual gearboxes, and/or for incorporation into existing manual gearbox designs not yet manufactured, with minimal modification. Turning then to describe this process, the initial steps involve removing or omitting the existing gear change lever, clutch actuation system, and rear casing. The new automated actuation mechanism 10 of the present invention is then fitted, ideally in or around the same location as previously occupied by the former gear change lever and clutch actuation assemblies.

In one variation, if the transmission is to make use of an engine-driven pump arrangement for the actuation mechanism, the input shaft is also removed for modification. More specifically, the input shaft is modified by including a central bore to provide access for a quill shaft, for an engine-driven pump. However, if an electro-hydraulic pump system is to be used, it will be appreciated that the input shaft does not need to be removed or replaced.

A new rear casing 5 is then added. This new casing preferably incorporates an integrated hydraulic pump system for the actuation mechanism, as well as integral mounting points for the hybrid motor, if required. A parking mechanism with a park locking functionality is also incorporated. This permits the transmission and hence the vehicle driveline to be selectively locked when the vehicle is placed in a parking mode, in a manner analogous to the park mode of a conventional automatic transmission.

Finally, any associated wiring, hydraulic connections and the like are completed, at which point the transmission is ready for installation or re-installation into the intended vehicle.

Figure 5:
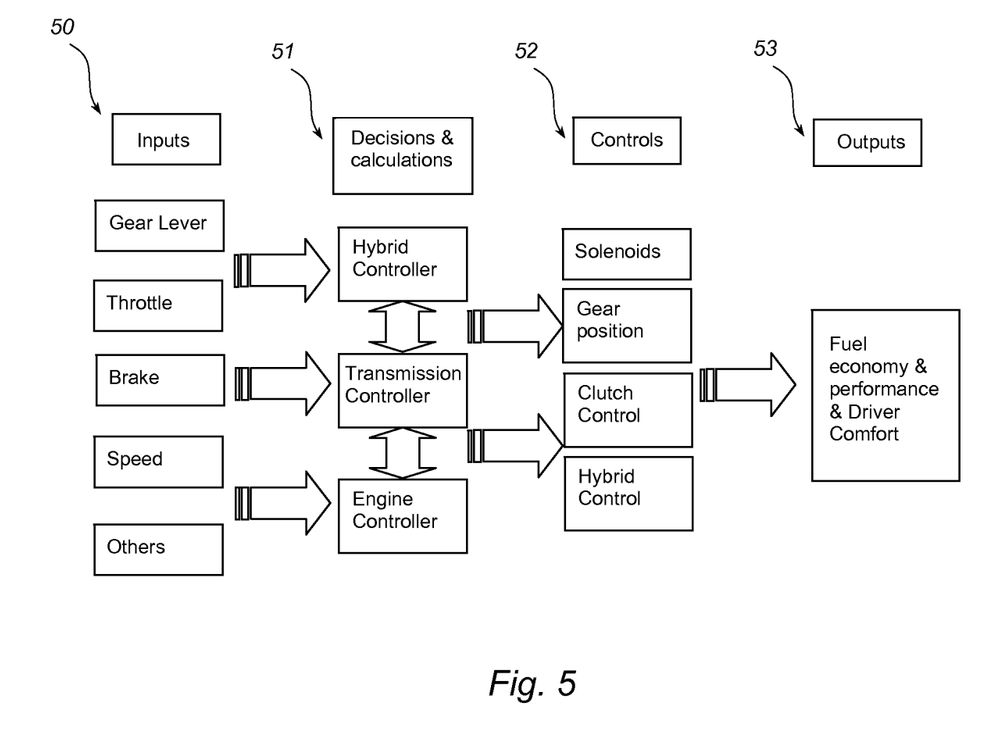
FIG. 5 is a block diagram showing diagrammatically the integration of the transmission system into a vehicle.

The housing for the automated actuation mechanism preferably also includes the control system and associated CPU(s). As previously indicated, the control system regulates the actuation mechanism in response to various control inputs from the vehicle, according to predetermined control algorithms, to effect the automatic gear changes, with appropriate coordination of the clutch, gear shift actuating arm(s), hybrid motor and optimally main engine speed in a manner that in general terms will be understood by those skilled in the art. FIG. 5 illustrates diagrammatically an indicative array of control inputs 50, control decisions and calculations 51, controls 52, and control outputs or results 53. It will be appreciated from this diagram that suitable control inputs include signals indicative of gear lever position, throttle position, brake position or pressure, and engine speed, as well as numerous others if desired such as road speed, manifold vacuum pressure, and the like. Preferred decisions and calculations 51 relate to the control of the hybrid motor, the transmission and the engine. Controls 52 relate to the various solenoids or other control elements regulating the position of the gear selection lever, the clutch and the hybrid motor. The primary outputs 53 relate to fuel economy, performance and driver comfort.

The present invention, at least in its various preferred embodiments, provides a number of advantages. Specifically, the automated manual transmission system retains a number of the benefits of conventional manual transmissions including relative simplicity of design, efficiency of operation, lightness of weight, and ease and cost of manufacture. Additionally, it provides a number of the advantages of automatic transmissions including two control pedals for the driver rather than three, the ease and convenience of fully automatic gear changes when required, and the option of clutchless gear changes in semi-automatic mode when desired. At the same time, it avoids a number of the disadvantages previously associated with each type of conventional transmission.

Additionally, it confers significant advantages over both conventional transmission types, as well as known AMTs, including particularly the ability to minimise the transient loss of driveline torque during gear changes so as to improve shift feel and reduce jerkiness and driver discomfort, without compromising overall efficiency or performance. In fact, the hybrid motor has the potential to improve fuel efficiency, by minimising the loss of momentum during gear changes.

Further, the optional use of the hybrid motor as part of a regenerative drive system enables power and driveline torque to be supplemented at other times, particularly for high torque requirements such as when climbing hills, towing loads or accelerating. This results in reduced primary engine size requirements and consequently allows significant additional gains in overall fuel economy, while reducing both capital and running costs for the vehicle.

The retrofitability of the invention enables most of the existing components in a conventional manual transmission to be used or reused, which potentially offers dramatic reductions in design, development and manufacturing costs. The system is also particularly flexible, due to the ability to integrate many alternative types of hybrid drive systems, including hydraulic, pneumatic and electrical hybrid systems, as well as inertial flywheel-based systems. In these and other respects, the invention represents a practical and commercially significant improvement over the prior art.

Although the invention has been described with reference to specific examples, it will be appreciated by those skilled in the art that the invention may be embodied in many other forms.

The invention claimed is:

1. An automated manual transmission system for a vehicle having an engine and a driveline, the transmission system including:
   an input shaft;
   a clutch adapted to be interposed between the input shaft and the engine;
   an output shaft adapted for connection to the driveline;
   a gearbox enabling selection of different transmission ratios between the input shaft and the output shaft;
   an actuation mechanism operatively connected to the clutch and the gearbox to effect disengagement and re-engagement of the clutch and coordinated selection of the transmission ratios;
   a hybrid motor operably connected to the output shaft; and
   a control system operable to regulate the actuating mechanism in response to control inputs, according to predetermined control criteria, thereby to effect automatic gear changes;
   the hybrid motor being responsive to the control system to provide supplementary torque to the driveline when the clutch is disengaged, thereby to reduce torque interruption in the driveline during the automatic gear changes.

2. An automated manual transmission system according to claim 1, wherein the control system is selectively operable in either a fully automatic mode, in which gear selections are determined and implemented according to the predetermined control criteria, or in a semi-automatic mode, in which gear selections are determined by a driver of the vehicle within predetermined control parameters but are implemented automatically by the actuation mechanism.

3. An automated manual transmission system according to claim 1, wherein the transmission system is adapted for retrofitting to a conventional manual gearbox.

4. An automated manual transmission system according to claim 1, wherein the hybrid motor is part of a regenerative drive system adapted to store energy from the driveline during braking or periods of off-peak load, and subsequently to feed stored energy back into the driveline to reduce the transient loss of driveline torque during gear changes.

5. An automated manual transmission system according to claim 1, wherein the hybrid motor is selected from a group comprising: electric motors; hydraulic motors; pneumatic motors; and inertial flywheel motors.

6. An automated manual transmission system according to claim 1, wherein the actuation mechanism incorporates at least one electro-hydraulic piston actuator.

7. An automated manual transmission system according to claim 6, including a pair of 3-position electro-hydraulic piston actuators regulated by a single multiplexing control valve.

8. An automated manual transmission system according to claim 7, wherein a first 3-position actuator is disposed to move a gear-shift lever longitudinally between a forward position, a neutral position and a rearward position, and wherein a second 3-position actuator is disposed to move the same gear-shift lever laterally between a left position, a central position and a right position, whereby the first and second actuators, cooperating through combinations of mutually orthogonal movements, provide automatic selection between up to six different gear ratios.

9. An automated manual transmission system according to claim 1, wherein the actuation mechanism is hydraulically operable.

10. An automated manual transmission system according to claim 9, wherein oil pressure for the actuation mechanism is sourced from a dedicated pump disposed within the transmission housing.

11. An automated transmission system according to claim 10, wherein the dedicated pump is powered substantially by the engine, via a pump drive shaft extending coaxially through a complementary bore formed in the input shaft.

12. An automated manual transmission system according to claim 9, wherein oil pressure for the actuation mechanism is sourced from an existing hydraulic circuit in the vehicle, from a dedicated hydraulic pump, or from an hydraulic accumulator.

13. A vehicle driveline incorporating an automated manual transmission system according to claim 1.

14. A vehicle incorporating an engine and a driveline, the driveline including an automated manual transmission system according to claim 1.

15. A method of converting a conventional manual transmission into an automated manual transmission system according to claim 1, the conventional manual transmission including an existing gearbox, an existing gear change lever, an existing clutch, and an existing clutch actuation system, the method including the steps of:

removing the existing gear change lever;

removing the existing clutch actuation system;

operatively connecting the actuation mechanism to the existing clutch and the existing gearbox to effect disengagement and re-engagement of the clutch and coordinated selection of gearbox transmission ratios;

operatively connecting the control system to regulate the actuation mechanism in response to control inputs, according to predetermined control criteria, thereby to effect automatic gear changes; and operatively connecting the hybrid motor so as, in response to the control system, to provide supplementary torque to the driveline when the clutch is disengaged, thereby to reduce torque interruption in the driveline during the automatic gear changes.

16. A method according to claim 15, wherein the conventional manual transmission further includes an existing rear casing and wherein the method includes the further steps of removing the existing rear casing and providing a new rear casing, wherein the new rear casing includes an integral hydraulic pump system for the actuation mechanism.

17. A method according to claim 15, including the further step of providing a parking mechanism with a park locking function, adapted in use to lock the transmission and hence the driveline, when the vehicle is placed in a parking mode.

18. A method according to claim 15, wherein the actuation mechanism is attached to the transmission at or near the location previously occupied by the gear change lever and clutch lever assemblies.

19. A method according to claim 15, including the further step of forming a bore through the centre of the input shaft, the bore being adapted to provide access for a coaxial quill shaft to drive an integral hydraulic pump for the actuation mechanism.

20. An actuation mechanism for an automated manual transmission system according to claim 1, the actuation mechanism including a pair of 3-position electro-hydraulic or electro-mechanical piston actuators, a first actuator of said 3-position actuators being disposed to move a gear-shift lever longitudinally between a forward position, a neutral position and a rearward position, and a second actuator of said 3-position actuators being disposed to move the gear-shift lever laterally between a left position, a central position and a right position, the first and second actuators being co-operable in use, in response to a control system, to provide automatic selection between a plurality of different gear ratios in the transmission system.

* * * * *

UNITED STATES PATENT AND TRADEMARK OFFICE
CERTIFICATE OF CORRECTION

PATENT NO.        : 8,672,803 B2                                              Page 1 of 1
APPLICATION NO.   : 13/140684
DATED             : March 18, 2014
INVENTOR(S)       : Tamba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this
Twenty-ninth Day of September, 2015

Michelle K. Lee
*Director of the United States Patent and Trademark Office*